United States Patent [19]

Rozsa

[11] 4,171,479

[45] Oct. 16, 1979

[54] METHOD AND DEVICE FOR THE READING OF DATA

[75] Inventor: Kalman Rozsa, Järfälla, Sweden

[73] Assignee: Datasaab Aktiebolag, Järfälla, Sweden

[21] Appl. No.: 897,517

[22] Filed: Apr. 18, 1978

[30] Foreign Application Priority Data

Apr. 19, 1977 [SE] Sweden ................................ 7704447

[51] Int. Cl.² ........................... G06K 7/08; G11B 11/9
[52] U.S. Cl. ...................................... 235/449; 360/45
[58] Field of Search .................... 360/86, 98, 99, 45, 360/51, 42; 340/146.3 Z, 146.3 F; 235/449, 450, 474, 436, 466

[56] References Cited

U.S. PATENT DOCUMENTS

| 3,676,644 | 7/1972 | Vaccaro | 235/449 |
| 3,676,645 | 7/1972 | Fickenscher | 340/146.3 Z |
| 3,932,731 | 1/1976 | Moore | 235/449 |
| 3,949,313 | 4/1976 | Tamada | 235/449 |
| 3,975,769 | 8/1976 | King | 360/86 |
| 4,012,791 | 3/1977 | Bleiman | 360/99 |

Primary Examiner—Robert M. Kilgore

[57] ABSTRACT

The disclosure relates to a method and device for reading data in the form of data pulses in a pulse train. The pulse train is obtained by the sensing of a flexible disc and contains, conventionally, a sequence of clock pulses which, in at least a portion of the pulse train, define mutually subsequent bit cells. These contain at most one of the data pulses. A bistable circuit is switched to its one state by the clock pulses and switched to its other state by the data pulses. The time which has elapsed after each switching of the bistable circuit is measured by means of a time circuit and the bistable circuit is switched if the elapsed time exceeds a value which is settable for each switching. A combinational circuit is provided for setting the above-mentioned level in dependence of the contents of at least the preceding bit cell.

13 Claims, 2 Drawing Figures

METHOD AND DEVICE FOR THE READING OF DATA

BACKGROUND OF THE INVENTION

1. Field of the Invention

The present invention relates to a method and device for reading data in the form of data pulses in a pulse train which contains a sequence of clock pulses which, at least in a portion of the pulse train, define mutually subsequent bit cells which each contain at most one of the data pulses, a bistable circuit being switched to its one state by the clock pulses and switched to its other state by the data pulses.

2. Description of the Prior Art

Such a pulse train is obtained, for example, on the sensing of a magnetic disc, such as "flexible disc" on which data was registered in accordance with the so-called "double frequency" method, that is to say in bit cells defined by registered clock pulses, a registered data pulse in each one of the bit cells representing a logic 1, and the absence of a registered data pulse representing a logic 0. Such a disc is divided into a plurality of sectors which each contain an identification field and a data field. Both of these fields may contain an address section of eight bit cells, an information-carrying section and a control section of sixteen bit cells. For the purposes of synchronization, both the identification field and the data field may be proceeded by 48 empty bit cells, that is to say in which no data pulses have been registered.

For reading data in the pulse train obtained by sensing, for example, a flexible disc on which data was registered in the above-described manner, the contents of the bit cells must be determined, which can be effected by establishing the time interval between the pulses. Since the data pulses are normally registered centrally in the bit cells, it is possible, by means of a monostable flip flop with a pulse duration of, for example, ¾ of the bit cell time, to determine whether any data pulse is registered in a bit cell or not. If the bit cell time is 4 $\mu$s, the pulse time of the monostable flip flop must, thus, amount to between 2 $\mu$s and 4 $\mu$s.

Even if the registration on the disc is effected with these nominal times, the pulses in the sensed pulse train may be offset in relation to their nominal positions. There are two reasons for this: (a) the pulse intervals vary in proportion to the speed of rotation of the disc on sensing; and (b) the pulse intervals vary with the data pattern. This latter variation depends upon the fact that a high packing density is used for registration on the disc, which entails that, on sensing, the gap of the magnetic head which is used has a not insignificant width, being rather comparable with the distance of the flow changes. Consequently, the magnetic head senses not only the separate flow changes but is also influenced by adjacent flow changes, that is to say the output signal of the magnetic head is dependent upon the data pattern on the disc.

In the information-carrying sections, the influence of the data pattern will be greatest when the bit cells, in which the data pulses are registered, change with bit cells in which no data pulses are registered. If the nominal bit cell time is 4 $\mu$s, an "empty" bit cell in the sensed pulse train in this case will obtain a length of 3.2 $\mu$s, while the interval from clock pulse to data pulse in the bit cells surrounding the empty bit cell amounts to 2.4 $\mu$s. The "window" for distinguishing a 1 and a 0 thereby shrinks from 2 $\mu$s to 0.8 $\mu$s.

As a consequence of the current appearance of the address section, this window is further reduced, more precisely to 0.4 $\mu$s. The reason for this is that, in the address section, which consists of eight bit cells, the sixth bit cell can be empty and those clock pulses which were to have defined the third and fourth bit cells may be omitted. As a result, in the sensed pulse train, the distance between the fifth data pulse and the subsequent clock pulse will be 2.8 $\mu$s.

It will be appreciated that a relatively small deviation in speed on sensing further reduces the width of the above-mentioned window and may make it impossible to distinguish between 0's and 1's.

In order to eliminate the reduction of the width of the above-mentioned window by speed variations, phase-locked loops have previously been used, but this is relatively expensive and, moreover, the synchronization is delayed, which makes it more difficult to read consecutive sectors on the disc.

SUMMARY OF THE INVENTION

The object of the present invention is to realize a method and device of the type disclosed by way of introduction which reduce the negative effect of the data pattern on the width of the above-mentioned window.

According to the invention, the time which has elapsed after each switching of the state of the bistable circuit is measured, and the state of the bistable circuit is switched if the time measured exceeds a value settable for each switching. Moreover, this value is set in dependence upon the contents of at least the preceding bit cell.

To this end, the device according to the invention comprises a time circuit which is disposed to measure the time which has elapsed after each switching of the state of the bistable circuit and to switch the bistable circuit if the time measured exceeds a value settable for each switching, and further comprises a combinational circuit for setting the above-mentioned value in dependence upon the contents of at least the preceding bit cell.

BRIEF DESCRIPTION OF THE DRAWINGS

The nature of the present invention and its aspects and objects will be more readily understood from the following brief description of the drawings, and subsequent discussion relating thereto.

In the accompanying drawings.

DESCRIPTION OF THE PREFERRED EMBODIMENT

Figure 1:
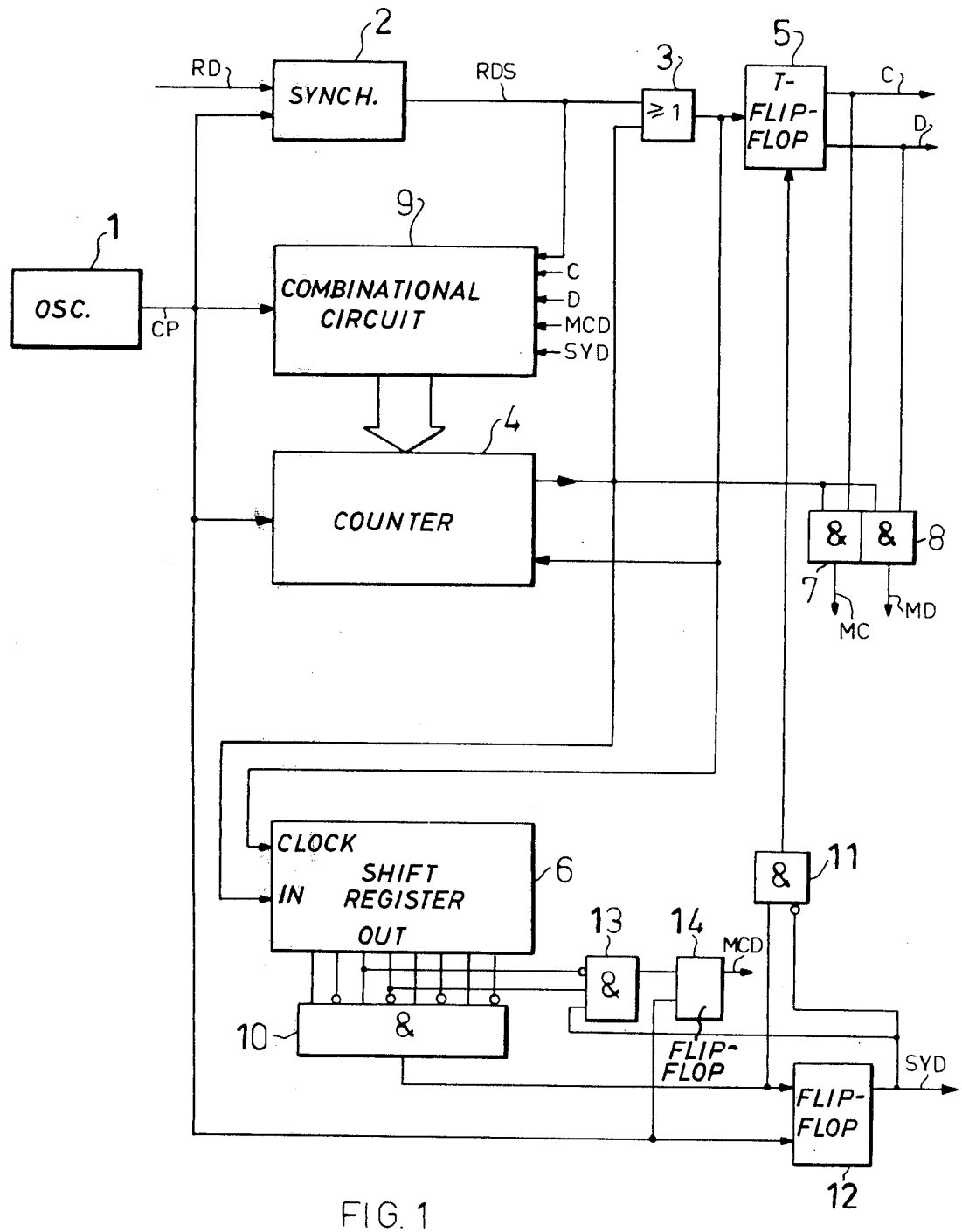
FIG. 1 is a block diagram of an embodiment of the device according to the invention.

A oscillator 1, more precisely a crystal oscillator, generates, on its output, a pulse train CP whose frequency substantially exceeds the highest frequency or pulse rate in the pulse train sensed from, for example, a flexible disc. The frequency of the oscillator 1 may be from 8-12 MHz in that case when the bit cell time nominally amounts to 4 $\mu$s.

A synchronizer 2 is coupled to the magnetic head (not shown) sensing the disc, for receiving a sensed pulse train RD which, thus, contains both clock pulses and data pulses, and for synchronization with the pulse train CP from the oscillator 1. On its output, the synchronizer 2 emits, hence, a synchronized pulse train RDS. The output of the synchronizer 2 is connected to an input to an OR-gate 3 whose other input is connected to an output from a presettable counter 4 and whose output is connected to the input to a bistable T-type flip flop 5. The output of the OR-gate 3 is also coupled to a start and feed input (parallel setting input) to the counter 4 and to the clock input to a shift register 6 of eight bits. The flip flop 5 has two outputs C and D which are each coupled to an input to their respective AND-gate 7 and 8, whose other inputs are connected to the output of the counter 4. For presetting the counter 4, this is connected to a combinational circuit 9 with inputs connected, int. al., to the oscillator 1, the synchronizer 2 and the outputs C and D of the flip flop 5. The counter 4 has, moreover, an input connected to the output of the oscillator 1. The series feed input of the shift register 6 is coupled to the output of the counter 4 and its eight outputs for parallel output are coupled direct, or by the intermediary of inverters, to inputs to an AND-gate 10. The output of the AND-gate 10 is connected partly to the one input of an AND-gate 11 and partly to the setting input of a flip flop 12 which also receives the pulse train CP of the oscillator 1 and whose output is coupled, by the intermediary of an inverter, to the other input of the AND-gate 11, whose output is coupled to the flip flop 5 for synchronization setting thereof. The third and fourth outputs of the shift register 6 are coupled, the one via an inverter and the other directly, each to an input to an AND-gate 13, whose third input is coupled to the output of the flip flop 12 and whose output is coupled to the setting input of a flip flop 14 which also receives the pulse train CP of the oscillator 1. The combinational circuit 9 has inputs connected to the outputs of the flip flops 12 and 14.

The above-described device operates as follows. Synchronization takes place during the 0's preceding each field, the contents of the shift register 6 being then "10101010". There will thereby be obtained a level on the output of the AND-gate 10 corresponding to a logic 1, and this, in combination with the presynchronization level on the output of the flip flop 12 corresponding to logic 0, entails that the AND-gate 11 switches the flip flop 5 to the state (hereinafter designated D state) in which the level on the output D of the flip flop 5 corresponds to a logic 1. The following input pulse to the flip flop 5 is a clock pulse which switches the flip flop 5 to that state (hereinafter designated C state) in which the level on the output C of the flip flop 5 corresponds logic 1. The flip flop 5 is thereby synchronized and this is displayed on the output of the flip flop 12 by a signal SYD at a level corresponding to logic 1.

Hereafter, the flip flop 5 is switched to the D state by the data pulses and to the C state by the clock pulses in the pulse train RDS. Each clock pulse and each data pulse starts the counting, by the counter 4, of the pulse train CP from the oscillator 1 and realizes feeding-in from the combinational circuit 9 of a preset value which corresponds approximately to ¾ of the bit cell time, the counter 4 emitting a signal corresponding to logic 1 on its output when this level is reached, the signal switching the state of the flip flop 5 and also restarting the counter 4. If a bit cell does not contain a data pulse, the counter 4 will, thus, for maintaining the synchronization of the flip flop 5, occasion the necessary switching of this flip flop. The same thing happens if a clock pulse were to be omitted from the pulse train RDS. Indications are obtained by means of the AND-gates 7 and 8 as regards the absence of clock pulses and data pulses in the pulse train RDS. The output signals from the gates 7 and 8 contain, thus, the information in the pulse train RDS.

It will be appreciated that it is possible, by means of the combinational circuit 9 (which as such may contain memory functions) to determine the preset level in the counter 4 in dependence upon the pattern of the previously received portion of the pulse train RDS and at least in dependence upon the contents of the preceding bit cell. For taking into account the shifting of the pulses in the pulse train RDS in relation to the pulses registered on the disc which arises on the occurrence of data pulses in every other cell, the counter 4 can, by means of the combinational circuit 9, be preset at a value which corresponds to a time-lag T between a start pulse 2 and output pulse from the counter 4 when the preceding bit cell contained a 1; and be preset at a value which corresponds to a time-lag $T + \Delta T$ between the above-mentioned pulses when the preceding bit cell contained a 0. Thus, according to the invention, a lower value is set in the counter 4 if the preceding bit cell contained a data pulse than if the preceding bit cell did not contain a data pulse. For the case of a nominal distance of 4 μs between the clock pulses in the pulse train RDS, the difference $\Delta T$ may be between 80–150 ns depending upon the frequency of the oscillator 1.

For taking into account of the shifting of the pulses in the pulse train RDS which occurs in the address section described by way of introduction, the combinational circuit 9 may be designed such that the counter 4, for time measurement after the data pulse which follows on the third omitted clock pulse, is set at a value which gives a long time-lag until the counter 4 emits its output pulse, for example up to from 4–6 μs when the nominal bit cell time is 4 μs.

Figure 2:
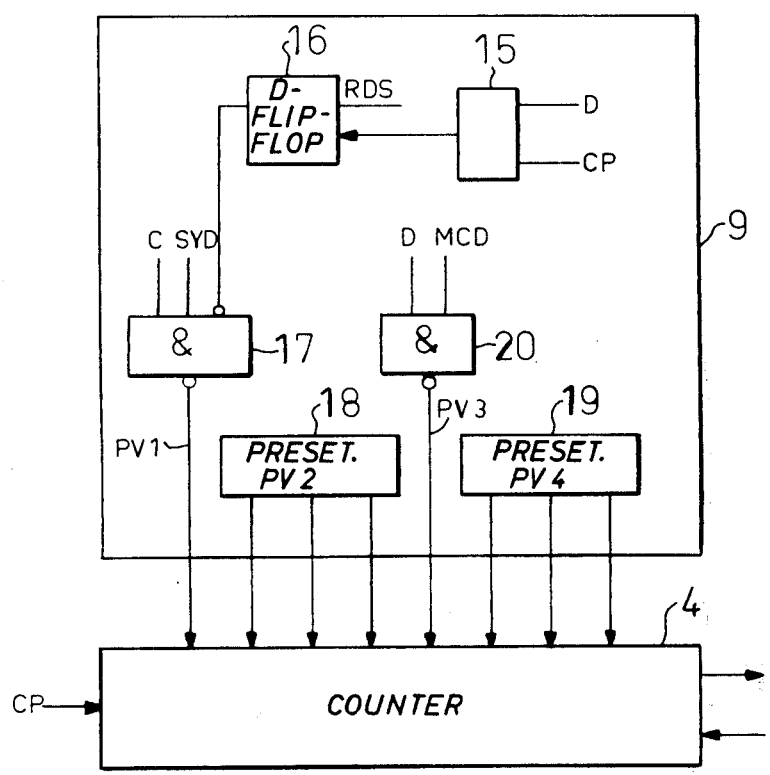
FIG. 2 shows an embodiment of the combinational circuit of FIG. 1.

One example of the combinational circuit 9 for executing the above-described presettings of the counter 4 is illustrated in FIG. 2. It contains an AND-gate 15 with inputs connected to the output of the oscillator 1 and the output D of the flip flop 5, and with an output connected to the clock input of a flip flop 16 of the D type. Furthermore, the flip flop 16 has a setting input connected to the output of the synchronizer 2, and the output of the flip flop 16 is coupled, by the intermediary of an inverter, to an input to a NAND-gate 17, whose two other inputs are connected to the output C of the flip flop 5 and to the output of the flip flop 12, respectively. The output of the NAND-gate 17 is coupled to the presetting input to the first binary step of the counter 4. The second, third and fourth binary steps of the counter 4 are preset at a fixed value (being 1 or 0) by a presetting circuit 18, as are its sixth, seventh and eighth binary steps preset at a fixed value by a presetting circuit 19. These fixed presetting values are dependent upon the frequency of the oscillator 1. The presetting input to the fifth binary step of the counter 4 is connected to the output from a NAND-gate 20 in the combinational circuit 9. The two inputs of this gate 20 are connected to the output D of the flip flop 5 and the output of the flip flop 14, respectively.

When the output signals from both of the NAND-gates 17 and 20 represent a logic 1, the circuits 18 and 19 provide a presetting value which corresponds to the above-mentioned time-lag T between start pulse to and output pulse from the counter 4. The addition $\Delta T$ to the time-lag T is obtained when the output signal from the NAND-gate 17 is a logic 0, that is to say when the reading circuits are synchronized, the flip flop 5 is in the C state and the preceding bit cell did not contain any data pulse (represented by the flip flop 16 in the circuit 9). The previously mentioned long time-lag is obtained when the output signal from the NAND-gate 20 is a logic 0, which occurs in the D state of the flip flop 5 after setting of the flip flop 14. This, in turn, occurs after reading of the fifth bit cell if a clock pulse is absent between the second and third bit cells.

Furthermore, the invention provides a previously unavailable possibility in conjunction with flexible discs to check read registered data with stricter requirements, the values in the counter 4 preset by means of the circuit 9 being selected such that the margins on reading are reduced. It is hereby possible to reveal, for example, poor disc quality, damaged magnetic layer and temporary drop-out which, in normal reading, would pass undetected.

Hence, it is clear that the invention makes possible a more reliable reading of data by observing the data pattern. Furthermore, the invention is particularly suited to work in conjunction with the reading of IBM compatible diskettes.

A number of modifications of the above-described embodiment are obviously possible within the spirit and scope of the invention as defined in the subsequent claims.

Finally, however, it should be mentioned that the oscillator 1 may, apart from crystal, include a microcircuit of the type 7400; that the synchronizer 2 and the flip flops 5, 12 and 14 may include a microcircuit of the type 7474; that the gate 3 may include a microcircuit of the type 7432; that the counter 4 may include two microcircuits of the type 74163; that the shift register 6 may include two microcircuits of the type 74194; that the gates 7, 8, 11 and 12 may include a microcircuit of the type 7408; and that the gate 10 may include a microcircuit of the type 7430.

What I claim and desire to secure by Letters Patent is:

1. A method for reading data in the form of data pulses in a pulse train which contains a sequence of clock pulses which in at least a portion of the pulse train define mutually subsequent bit cells each containing at most one of the data pulses, a bistable circuit being switched to its one state by the clock pulses and switched to its other state by the data pulses, wherein the time which has elapsed after each switching of the state of said bistable circuit is measured, and wherein the state of said bistable circuit is switched if the time measured exceeds a value settable for each switching, and wherein this value is set in dependence upon the contents of at least the preceding bit cell.

2. The method as recited in claim 1, wherein a lower value is set if the preceding bit cell contained a data pulse than if the preceding bit cell did not contain a data pulse.

3. The method as recited in claim 1, wherein the value for time measurement after a data pulse which follows on two data pulses in bit cells without defining clock pulses and is to be followed by a bit cell without a data pulse is made greater than a nominal time between the clock pulses.

4. The method as recited in claim 3, wherein said value is caused to be up to 1.5 times greater than the nominal time between the clock pulses.

5. A device for reading data in the form of data pulses in a pulse train which contains a sequence of clock pulses which, at least in a portion of the pulse train, define mutually subsequent bit cells which each contain at most one of the data pulses, the device having a bistable circuit which is operative to be switched to its one state by the clock pulses and to be switched to its other state by the data pulses, comprising:

a. a time circuit which is disposed to measure the time which has elapsed after each switching of the state of said bistable circuit and to switch said bistable circuit if the measured time exceeds a value settable for each switching; and b. a combinational circuit for setting said value in dependence of the contents of at least the preceding bit cell.

6. The device as recited in claim 5, wherein said combinational circuit is operative to set a lower value if the preceding bit cell contained a data pulse than if the preceding bit cell did not contain a data pulse.

7. The device as recited in claim 5, wherein said combinational circuit is operative to set a value which is greater than a nominal time between the clock pulses, for the time measured after a data pulse which follows on two data pulses in bit cells without defining clock pulses and is to be followed by a bit cell without a data pulse.

8. The device as recited in claim 7, wherein said combinational circuit is operative to set a value which is up to 1.5 times the nominal time between the clock pulses, for the measured time after said data pulse.

9. The device as recited in claim 5, wherein the time circuit is a counter which is presettable by said combinational circuit and is disposed to count pulses obtained from an oscillator.

10. The device as recited in claim 9, wherein the frequency of the oscillator is considerably higher than the highest pulse rate in the pulse train.

11. The device as recited in claim 5, wherein said time circuit is connected to said bistable circuit for emitting a signal, when the preset level is reached, for switching said bistable circuit, and wherein two AND-gates are operative to receive on their one inputs the switching signal of said time circuit, whereas the other inputs of the AND-gates are each connected to one of the two outputs of said bistable circuit.

12. The device as recited in claim 11, wherein said combinational circuit has inputs connected to the outputs of said bistable circuit.

13. The device as recited in claim 5, further comprising a shift register with a clock input which is connected to the switching input of said bistable circuit, a series feed input which is connected to the output of said time circuit, and a plurality of outputs for parallel output which, in accordance with a unique synchronization pattern in the pulse train, are connected directly or via inverters to an AND-gate for switching said bistable circuit to the correct commencement state.

* * * * *